Feb. 18, 1969   E. RITSCHL ET AL   3,428,153
ANTISKID BRAKE FOR A VEHICLE WHEEL
Filed Nov. 17, 1966

INVENTORS
Evžen Ritschl, Jiří Kubínek
BY
Richard Low
Ag't

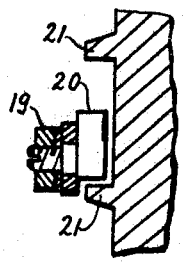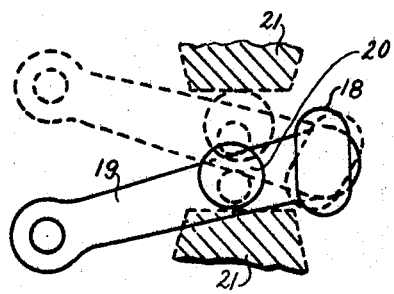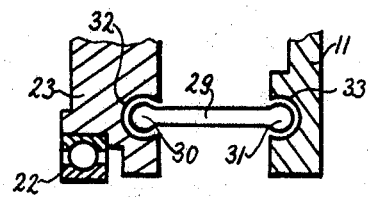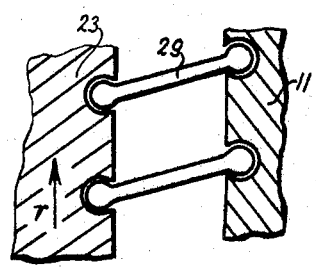

United States Patent Office 3,428,153
Patented Feb. 18, 1969

3,428,153
ANTISKID BRAKE FOR A VEHICLE WHEEL
Evžen Ritschl and Jiří Kubínek, Prague, Czechoslovakia, assignors to JAWA, narodní podnik, Tynec nad Sazavon, Czechoslovakia
Filed Nov. 17, 1966, Ser. No. 595,077
Claims priority, application Czechoslovakia,
Nov. 18, 1965, 6,890/65
U.S. Cl. 188—181       8 Claims
Int. Cl. B60t 8/12, 7/12

ABSTRACT OF THE DISCLOSURE

An antiskid brake for a vehicle wheel. Within a brake drum there is a freely rotatable flywheel whose rotation is limited to a fraction of a revolution. The flywheel is resiliently biased toward a given angular position relative to the brake drum. A first brake member which has a conically flaring face extending around the drum axis can move along the latter axis but cannot rotate with respect thereto, while a second brake member is provided with a conically tapering face extending around the drum axis to coact with the first brake member. The second brake member is radially displaced so that when the second brake member engages the first brake member the latter is axially displaced. The latter axial displacement of the first brake member takes place in opposition to a resilient means. A motion transmission between the flywheel and the first brake member moves the latter away from engagement with the second brake member in opposition to the resilient means in response to rotary movement of the flywheel relative to the drum.

---

Figure 1:
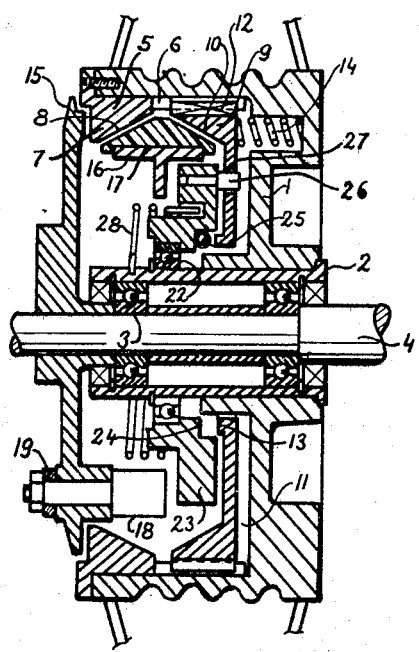

This invention relates to friction brakes for vehicle wheels, and particularly to a brake which prevents blocking of the associated wheel during skidding.

It is known to equip vehicle wheels with brakes which avoid blocking of the wheel, but the known brakes of this type are relatively complex, and correspondingly bulky and costly. They employ hydraulic, pneumatic, or electrical auxiliary circuits which are relatively delicate and subject to failure in service if not carefully maintained. They also require an external source of operating power in the form of a pressure fluid or electric energy.

It is an object of the invention to provide an antiskid brake for a vehicle wheel which is simple in its structure and operation, and therefore rugged and dependable.

A further object is the provision of a brake of the type described which operates entirely by mechanical means and is independent of power sources outside the brake mechanism proper.

More specifically, the invention aims at a wheel brake which automatically applies and releases the brake if the operator suddenly actuates the brake mechanism and the vehicle begins to skid because of wheel blocking.

Another object is the provision of an antiskid brake which can be built at a cost low enough to make such a brake practical even in two-wheeled vehicles.

With these and other objects in view, the invention provides a brake drum with a flywheel mounted for rotation relative to the drum axis, but limited in its rotation by abutment means to a fraction of one revolution. A spring or like yieldably resilient means bias the flywheel toward a certain angular position relative to the brake drum.

A first brake member such as a drum liner having a conically flaring face about the axis is impeded in its angular movement about the axis relative to the brake drum while it is permitted to move axially. A second brake member such as a brake shoe which has a conically tapering face about the brake axis may be moved by actuating means in a radially extending direction toward and away from a position of substantially conforming engagement of the conical faces, whereby the first brake member is axially moved in a predetermined direction by the engaged second brake member during movement of the latter in the radial direction toward the position of engagement. The second brake member is resiliently biased against axial movement in the predetermined direction.

Motion is transmitted between the flywheel and the first brake member in such a manner that the first brake member is moved away from its position of engagement with the second brake member in the afore-mentioned predetermined direction in response to the rotation of the flywheel relative to the brake drum.

Figure 2:
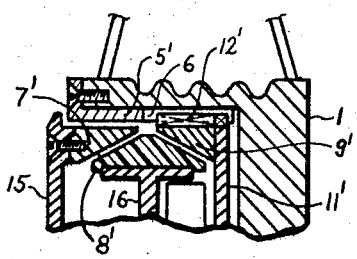

Other features, additional objects and many of the attendant advantages of this invention will be readily appreciated as the same becomes better understood by reference to the following detailed description of preferred embodiments when considered in connection with the accompanying drawings in which:

FIG. 1 shows a brake of the invention in axial section;
FIG. 2 shows a portion of a modified brake in a view corresponding to that of FIG. 1;
FIG. 3 shows a detail of the brake of FIG. 1 in an enlarged view taken in the direction of the brake axis;
FIG. 4 shows the device of FIG. 3 in radial section;
FIG. 5 shows a modification of another portion of the brake of FIG. 1 on an enlarged scale; and
FIG. 6 shows the device of FIG. 5 in a fragmentary developed view.

Referring now to the drawing in detail, and initially to FIG. 1, there is seen a brake drum 1 fixedly mounted on a tubular axle housing 2. Two axially spaced ball bearings 3 are interposed between the axle housing 2 and an axle 4. An annular liner 5 is fixedly mounted on the internal cylindrical face of the drum 1. One axially terminal portion of the liner 5 is provided with axial grooves 6. The other axially terminal portion 7 has an annular inner face 8 which conically flares in an axial direction toward the grooved portion of the liner 5.

A ring 9 having an annular inner face 10 is integrally fastened to a generally flat annular disc 11. The face 10 conically flares toward the portion 7 of the liner 5. Axial ribs 12 on an outer, substantially cylindrical face of the ring 9 are slidably received in the grooves 6, whereby the disc 11 and ring 9 may move axially relative to the brake drum 1, but are secured against rotation relative to the drum. Helical compression springs 14, of which only one is seen in FIG. 1, are partly received in recesses in the radial end wall of the drum 1, and axially project from the respective recesses to engage the disc 11, and to urge the same to move toward the liner portion 7.

A helical cam track 13 on the disc 11 near the housing 2 spirals about the axis of the brake. Its function will presently become apparent.

A brake shield 15 is fixedly mounted on the stationary axle 4 and protects the brake elements arranged within the cavity of the drum 1. Two brake shoes 16, of which only one is partly seen in FIG. 1, are mounted on the shield 15 by means of anchor pins (not shown) in a conventional manner. Each brake shoe 16 has a friction facing 17 whose exposed or outer surface has two conically tapering axial portions respectively opposite the faces 8 and 10, and conformingly engageable with the last-mentioned faces by pivoting movement of the brake shoes 16 on their non-illustrated anchor pins. The brake shoes 16 are normally held radially away from the liner 5 and the ring 9 by a non-illustrated return spring in the usual manner, and may be engaged with the faces 8, 10 by means of an expander cam 18 which is rotatably mounted on the shield 15.

As is better seen in FIGS. 3 and 4, the cam is tilted by means of a short actuating arm 19 in a manner conventional in itself. The angular movement of the cam 18 and of the arm 19 is limited by abutting engagement of an eccentric 20 on the arm 19 with integral, projecting stops 21 on the shield 15. The eccentric 20 may be adjusted by rotation on the arm 19, and may be fastened in the adjusted position in a manner not explicitly shown, to vary the stroke of the arm 19 which is indicated in FIG. 3 by showings of the angularly movable elements in their terminal positions in solid and in broken lines.

Reverting to FIG. 1, there is further seen a flywheel 23 which is rotatably mounted on the axle housing 2 within the cavity of the drum 1 in an axially fixed position by means of a ball bearing 22. A helical cam track 24 on the flywheel 23 is axially opposite the cam track 13 and is parallel to the same. Bearing balls 25 are interposed between the helical surfaces 11, 24. Pins 26 which axially project from the flywheel 23 engage associated slots 27 in the disc 11. The slots 27 are arcuate about the axis of the brake and limit the relative rotation of the flywheel 23 and of the drum 1 to a small fraction of one revolution by abutment of the pins 26 against a transverse end face of the disc in the slot 27, only one pin 26 and the associated slot 27 being shown in the drawing.

One end of a helical torsion spring 28 is fastened to the axle housing 2 while the other end engages the flywheel 23 and urges the flywheel to turn on the bearing 22 in such a manner that the cam track 24 moves axially away from the track 13 on the disc 11, thereby permitting the springs 14 to move the ring 9 toward the face 8.

It will be understood that the brake drum 1 is fixedly fastened to a wheel while the axle 4 is attached to the vehicle body in which the illustrated brake is installed in such a manner that the axle 4 normally is stationary relative to the body. The brake is actuated by a brake pedal connected to the arm 19 by a suitable linkage in a known manner, not shown.

When the cam 18 is pivoted by means of the arm 19, the brake shoes 16 move toward the inner face of the drum 1, and the two conically tapering surface portions of the friction facing 17 engage the faces 7, 10. The brake shoes 16 may move somewhat in an axial direction on their anchor pins so that the pressure of the shoes causes the disc 11 to move axially away from the friction facing 17 under the applied braking pressure against the restraint of the springs 14 until the stop 20 on the arm 19 abuts against one of the stops 21 on the brake shield 15.

The maximum pressure that can be applied in braking is thus determined by the stroke of the arm 19 and by the characteristic of the springs 14. The ring 9 is held in engagement with the facing 17 under this predetermined maximum braking pressure as long as the flywheel 23 is inactive.

If the non-illustrated wheel attached to the drum 1 should skid on the road because of the applied braking force, its rotary movement, and that of the drum 1 stops suddenly. The stored energy causes the flywheel 23 to turn relative to the drum 1 within the limits set by circumferential abutment of the pins 26 against end walls in the slots 27, the disc 11 being secured against rotation relative to the drum 1, and being stopped together with the drum 1 when skidding of the associated wheels begins. The relative angular displacement of the flywheel 23 and of the disc 11 causes the cam tracks 13, 24 to shift the disc 11 axially against the springs 14, and away from the friction facing 17, thereby releasing the brake and permitting rotation of the wheel and of the attached drum 1.

Resumed rotation of the drum 1 and of the connected disc 11 causes the flywheel 23 to revert to its original position, thereby permitting the springs 14 to move the disc 11 toward the friction facing 17, thereby again applying the brake. If the operator holds the arm 19 in the position of maximum braking pressure, and if the wheel should still skid, a new cycle of brake release and brake application starts and is repeated as long as the prevailing conditions persist. The brake illustrated thus automatically performs the operation which is well known to minimize skidding.

Structural modifications of the apparatus of FIGS. 1, 3, and 4 which do not basically affect the afore-described mode of operation are shown in FIGS. 2, 5, and 6.

The modified brake of FIG. 2 has a liner 5' provided with axial grooves 6 in one axially terminal portion, but not equipped with a ring 7 at its other axial end portion. A ring 7' is mounted instead on the brake shield 15 for engagement of its conical face 8' with the friction lining 17 on the shoes 16. The ring 9 integral with the disc 11 shown in FIG. 1 is replaced by a ring 9' loosely inserted into a receptacle formed by a flat disc 11' and by axial ribs 12' distributed over the circumference of the disc 11' and slidably engaged in the grooves 6. Rotation of the ring 9' with the brake shoes 16 relative to the disc 11' and the drum 1 is impeded by friction under a contact pressure which increases with the applied brake pressure.

The cooperating helical cam faces or tracks 13, 24 and the interposed balls 25 shown in FIG. 1 are replaced by spacer bars 29 in the modified apparatus partly shown in FIGS. 5 and 6, and identical with the brake of FIG. 1 as far as not shown. The bars 29 have spherical terminal heads 30, 31 which are conformingly received in sockets 32, 33 in the flywheel 23 and in the disc 11 respectively, only one bar 29 being shown in the axially sectional view of FIG. 5 and two bars in the fragmentary developed view of FIG. 6. The ball-and-socket joints between the bars 29 and the flywheel 23 and disc 21 respectively prevent circumferential movement of the heads 30, 31 relative to the engaged disc and flywheel. The spring 28 biases the flywheel 23 toward a position in which the bars 29 are obliquely inclined relative to the brake axis, as is shown in FIG. 6, and the heads 30, 31 are obliquely offset relative to the brake axis. When stoppage of the disc 11 during skidding of the associated wheel causes the flywheel 23 to rotate in the direction of the arrow $r$ in FIG. 6 relative to the disc 11, the bars 29 pivot in their sockets toward a position in which the heads 30, 31 are axially aligned so that the bars 29 are parallel to the brake axis and thereby push the disc 11 away from the friction facing 17 to release the brake in the manner described above.

The brake of the invention thus prevents blocking of a wheel when the brake is suddenly applied by the operator under conditions of the road surface which favor skidding. The antiskid brake mechanism of the invention is simple, and therefore reliable in its operation. It operates entirely by mechanical means, and relies neither on pneumatic, hydraulic, nor electrical devices for its operation. It does not need an external power source of any kind.

The brake mechanism fits into brake drums of conventional size because it occupies very little space. It can be produced at low cost, and is thus practical for use even in two-wheeled vehicles such as bicycles and motorcycles.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

We claim:
1. In a wheel brake for a vehicle, in combination:
 (a) a brake drum having an axis;
 (b) a flywheel mounted for rotation relative to said drum about said axis;

(c) abutment means limiting said rotation to a fraction of one revolution;
(d) first yieldably resilient means biasing said flywheel toward a predetermined angular position relative to said brake drum;
(e) a first brake member having a conically flaring face about said axis;
(f) means impeding angular movement of said first brake member about said axis relative to said brake drum while permitting axial movement of the brake member;
(g) a second brake member having a conically tapering face about said axis;
(h) actuating means for moving said second brake member in a radially extending direction toward and away from a position of substantially conforming engagement of said faces, whereby the first brake member is axially moved in a predetermined direction by the engaged second brake member during movement of the second brake member toward said position;
(i) second yieldably resilient means biasing said first brake member to move in a direction opposite to said predetermined direction; and
(j) motion transmitting means interposed between said flywheel and said first brake member for moving said first brake member away from said position of engagement against the restraint of said second yieldably resilient means in response to said rotation of the flywheel relative to said drum.

2. In a brake as set forth in claim 1, a stationary brake portion, said drum being mounted on said stationary portion for rotation about said axis, and said second brake member being mounted on said stationary portion for movement thereon toward and away from said position of engagement.

3. In a brake as set forth in claim 2, an annular member having a conical face about said axis flaring toward said first brake member, said face of said first brake member conically flaring toward said annular member; and means axially securing said annular member relative to said brake drum, said second brake member having another conically tapering face about said axis, said other face substantially conformingly engaging said face of said annular member in said position of engagement of said faces of the first and second brake members.

4. In a brake as set forth in claim 3, said annular member being fixedly fastened to said drum.

5. In a brake as set forth in claim 3, said annular member being fixedly fastened to said stationary brake portion.

6. In a brake as set forth in claim 1, stop means engaging said actuating means for limiting movement of said second brake member in said radially extending direction.

7. In a brake as set forth in claim 1, said motion transmitting means including cooperating cam means respectively connected to said flywheel and to said first brake member for moving said first brake member in response to said rotation of the flywheel.

8. In a brake as set forth in claim 1, said motion transmitting means including a spacer member axially interposed between said flywheel and said first brake member and having respective axially terminal portions secured against circumferential movement relative to said flywheel and to said first brake member, said terminal portions being offset obliquely relative to said axis in said predetermined angular position of said flywheel, and said spacer member moving toward a position of axial alignment of said terminal portions thereof when said flywheel rotates relative to said drum, whereby said drum and said first brake member are moved axially apart.

References Cited
UNITED STATES PATENTS

| | | | |
|---|---|---|---|
| 1,988,986 | 1/1935 | Sterns | 188—181 |
| 2,012,366 | 8/1935 | Wevers | 188—181 |

DUANE A. REGER, *Primary Examiner.*

U.S. Cl. X.R.

188—140